Aug. 5, 1969 YOSHIO AOYAMA 3,459,509
CONTINUOUS CRYSTALLIZATION APPARATUS FOR EVEN GRAINS
Filed May 9, 1966 3 Sheets-Sheet 2

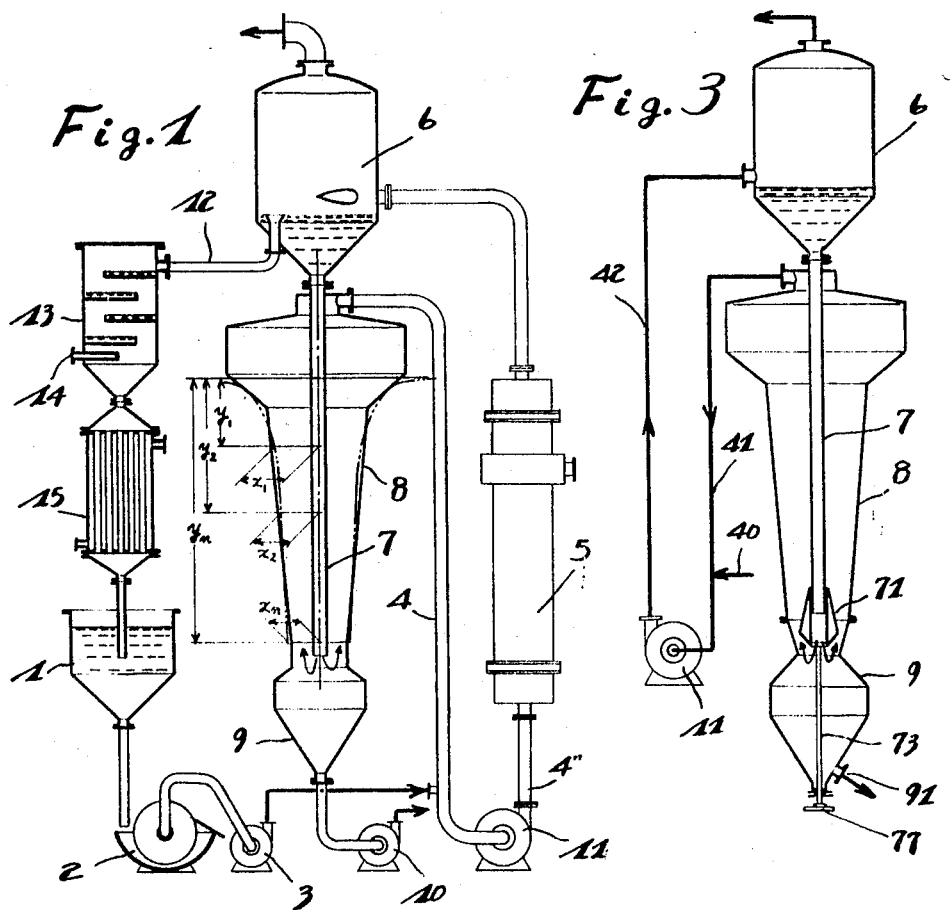

Yoshio Aoyama
INVENTOR

BY Darbo, Robertson & Vandenburgh
ATTORNEY

United States Patent Office 3,459,509
Patented Aug. 5, 1969

3,459,509
CONTINUOUS CRYSTALLIZATION APPARATUS
FOR EVEN GRAINS
Yoshio Aoyama, Osaka, Japan, assignor to Daido
Namarikakoki Company, Limited, Konohanaku,
Osaka, Japan
Filed May 9, 1966, Ser. No. 548,690
Int. Cl. B01d 9/02
U.S. Cl. 23—273                                  3 Claims

ABSTRACT OF THE DISCLOSURE

An apparatus having a crystallizer vessel the side wall of which has a profile approximately defined by a curve $y = -1/x^{12}$ the vertical center line of vessel taken as the y-axis and the diameter at the top of vessel taken as the x-axis, to get crystalline grains to grow in proportion to the distance through which they fall in the vessel, also having a movable block to restrict a cross section of the crystallizer vessel at the neck thereof.

The present invention relates to a crystallization apparatus to yield even crystalline grains continuously in high efficiency, and particularly to the profile of crystallizer which plays the primary role in the operation system of apparatus.

It is of known practice in batch-type operations of crystallization that initially the liquid is filled in a crystallizer and then it is evaporated or cooled in the crystallizer to increase the degree of saturation so as to grow bigger the kernel grains formed in the same crystallizer or the seed grains supplied from outside.

It is however required in continuous operations of crystallization that a circulation system of mother liquor is arranged with crystallizer, pit, discharger, feeder, condenser and other necessary units. A series of experiments and analyses carried out by the inventor reveals that the construction and arrangement of these units in the system of apparatus have considerable effects on the crystallization of grains, and especially that the profile or shape of crystallizer has a substantial effect not only on the yield but also the size of grains to be crystallized in it.

FIG. 1 is a schematic view of a crystallization apparatus in accordance with the invention to yield continuously crystalline grains of Glauber's salt whose solubility is a decreasing function of temperature.

FIG. 2 shows a profile curve in dark line, and another profile curve in dotted line, of the side wall of crystallizer in accordance with the invention.

FIG. 3 is a schematic view of a crystallization apparatus in accordance with the invention to yield continuously crystalline grains of a matter whose solubility is an increasing function of temperature.

Figure 4:
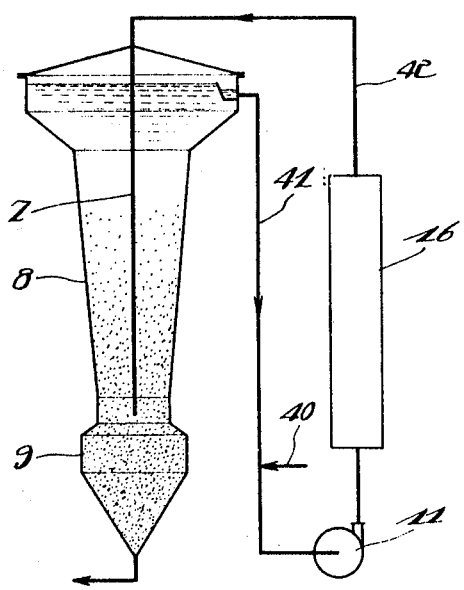
FIG. 4 is a modification of FIG. 3.

For the operation of apparatus shown in FIG. 1, hydrated Glauber's salt is initially dissolved in a tank 1 and then passed through a filter 2. The filtrate is sent to a heater 5 through pipes 4, 4' by the action of a pump 3. The heated liquid is partially evaporated to increase the concentration in an evaporator 6. The liquid now contains sufficient kernel grains which are formed in the heater 5 and the evaporator 6. It is then brought through a vertical pipe 7 from the evaporator 6 down to the bottom of a crystallizer 8, where it is released upward. As the liquid goes up in the crystallizer 8, the kernel grains carried in it get bigger in size. As they get bigger, the grains get heavier and gradually sink down to the bottom neck of crystallizer 8 where the cross section of crystallizer is minimized and therefore the upward velocity of liquid is maximized. Only those grains which are grown sufficiently heavy further sink down into a pit 9 against the maximized upward velocity of liquid. Thus grains of sufficiently even size are gathered in the pit 9, out of which they are discharged by the action of slurry pump 10.

The liquid which comes up to the top of crystallizer 8 is now sufficiently low in concentration. It is sent again to the heater 5 by the action of a pump 11 for re-circulation.

Meanwhile, the liquid is partially taken out of the evaporator 6 and sprayed into contact with cooling air in an exposure column 13 by way of a pipe 12, the cooling air being supplied through an inlet 14. The liquid is further cooled in a surface condenser 15 to recover the solubility sufficiently. It is finally brought back into the tank 1, where it dissolves Glauber's salt and starts for re-circulation.

So far described is the system operation of apparatus for continuous crystallization of hydrated Glauber's salt into anhydrous even-sized grains. In the crystallizer 8, grains are grown as the result of molecular transition from liquid phase to solid phase by an energy, the value of which is the difference between total free energy active at the surface of grains and total free energy of ions active in the solution. A further analysis of the molecular transition from liquid to solid phase will reveal the following relation:

$$N\alpha \frac{C-Ci}{R} \tag{I}$$

where:

N = Growth rate of grain surface
Ci = Concentration of liquid film over grain surface
C = Average concentration of liquid
R = Resistance factor.

In the above relation, $1/R$ and the relevant constant will be expressed as a transition factor $k$. N will be expressed as the weight of substance $dW$ transferred from liquid to unit surface area of grain per unit time $d\theta$. $(C-Ci)$ will be expressed as a concentration difference $\Delta C$. Then the relation (I) will be put into the following equation:

$$dW/D\theta = kA\Delta C \tag{II}$$

where A = Surface area of grain.
From (II):

$$dW = kA\Delta C \times d\theta \tag{III}$$

It will be indicated from (III) that the growth of a crystalline grain in terms of weight W is in proportion to the time $\theta$ during which the grain is floating in mother liquor, given $kA\Delta C$; in another expression:

$$W_2 - W_1 \alpha \theta_2 - \theta_1 \tag{IV}$$

Since the volume of grain is in proportion to its weight, the growth of a grain in terms of volume $L^3$, that is the third order of major liner dimension L (for instance radius of grain), will be in proportion to the time $\theta$, as expressed below:

$$L_2{}^3 - L_1{}^3 \alpha \theta_2 - \theta_1 \tag{V}$$

In a state that a grain floats at a given level in the upward flow of liquid in the crystallizer, the buoyancy of grain caused by the upward liquid flow is balanced with the gravity of grain relative to liquid, that is, the buoyancy of grain is equal in quantity, and opposite in direction, to the relative gravity of grain, thus:

$$-v^2/2g \times L^2 \times \rho_1 \times \phi_s = (\rho_2 - \rho_1) \times L^3 \times \phi_v \qquad \text{(VI)}$$

Where:
$v$=Upward flow rate of liquid
$g$=Gravity constant
$\phi_s$=A real factor of grain
$\phi_v$=Volumetric factor of grain
$\rho_1$=Specific density of liquid
$\rho_2$=Specific density of grain Then:

$$-v^2/2g = L \times K_1 \qquad \text{(VII)}$$

Where $K_1 = \dfrac{(\rho_2 - \rho_1)}{\rho_1} \times \dfrac{\phi_v}{\phi_s}$ (constant)

The flow rate of liquid $v$ is given as follows:

$$v = V/\pi x^2 \qquad \text{(VIII)}$$

Where:
$V$=Feed volume of liquid per unit time into crystallizer
$x$=Radius of crystallizer From (VII), (VIII):

$$-V^2/2g\pi^2 x^4 = L \times K_1 \qquad \text{(IX)}$$

Given the sedimentation velocity of crystalline grain, the time $\theta$ during which a grain floats on the way of continuous sedimentation will be in proportion to the sedimentation distance $y$, in another expression:

From (V), (X):

$$\theta_2 - \theta_1 \alpha y_2 - y_1 \qquad \text{(X)}$$

$$L_2^3 - L_1^3 \alpha y_2 - y_1 \qquad \text{(XI)}$$

The above relation (XI) will indicate that the growth of grain in terms of volume $L^3$ is in proportion to the sedimentation distance $y$. It follows that the growth of grain in terms of liner dimension L (for distance radius of grain) will be in proportion to the third root order of sedimentation distance $\sqrt[3]{y}$ as expressed below:

$$L_2 - L_1 \alpha \sqrt[3]{y_2} - \sqrt[3]{y_1} \qquad \text{(XII)}$$

In a continuous sedimentation the relation (XI) will also indicate the following:

$$y_1 \to y_2 \rightleftarrows L_1 \to L_2 \qquad \text{(XIII)}$$

Now the relation between the radius of crystallizer $x$ and the sedimentation distance of grain $y$ is practically illustrated in FIG. 1, where the crystallizer 8 has a radius $x_n$ at any particular height $y_n$. Thus, for instance, the radius of crystallizer 8 continuously varies from $x_1$ to $x_2$ as a grain falls from $y_1$ to $y_2$ vertically, in another expression:

$$y_1 \to y_2 \rightleftarrows x_1 \to x_2 \qquad \text{(XIV)}$$

On account of (XIII) and (XIV), the Equation IX will be expressed as below:

$$-\frac{V^2}{2g\pi^2}\left(\frac{1}{x_2^4} - \frac{1}{x_1^4}\right) = K_1 \times (L_2 - L_1) \qquad \text{(XV)}$$

The above equation will further be expressed as below:

$$-\left(\frac{1}{x_2^4} - \frac{1}{x_1^4}\right) = K_2 \times (L_2 - L_1) \qquad \text{(XVI)}$$

Where $K_2 = \dfrac{2g\pi^2}{V^2} \times K_1$ (constant)

From (XII), (XVI):

$$\sqrt[3]{y_2} - \sqrt[3]{y_1} = -K_3 \times \left(\frac{1}{x_2^4} - \frac{1}{x_1^4}\right) \qquad \text{(XVII)}$$

where $K_3$=Constant.

From (XIV), (XVII):

$$y_1 \xrightarrow{\lim} y_2 (\sqrt[3]{y_2} - \sqrt[3]{y_1}) = x_1 \xrightarrow{\lim} x_2 \left\{-K_3 \times \left(\frac{1}{x_2^4} - \frac{1}{x_1^4}\right)\right\} \qquad \text{(XVIII)}$$

The following relation will be derived from (XVII) and (XVIII)

$$\sqrt[3]{y} = -K_3/x^4 \qquad \text{(XIX)}$$

Finally the following relation will be derived from (XIX):

$$y = -K/x^{12} \qquad \text{(XX)}$$

where K=Constant.

The above relation (XX) provides the general profile curve for the side wall of crystallizer 8, based on the plan that the growth of crystalline grain in terms of weight is in proportion to the sedimentation distance within the crystallizer. In a crystallizer which has a profile of side wall generally defined by the curve of (XX), therefore, each grain falls downward with its weight increasing continuously in proportion to its sedimentation distance to the effect that grains of same weight are floating at the same height in the crystallizer, thus yielding crystalline grains of substantially even size in the pit 9 at the bottom of crystallizer 8.

Theoretically the equation (XX) stands with any value of the constant K. Practically, however, the Equation XX will provide a convenient profile curve for the side wall of crystallizer with the value of the constant K being equal to 1. This profile curve is expressed in the following Equation XXI and illustrated in dark line in FIG. 2:

$$y = -1/x^{12} \qquad \text{(XXI)}$$

More practically, the profile curve of (XXI) will be simplified into a composition of straight sections as illustrated in dotted line in FIG. 2. The crystallizer 8 shown in FIG. 1 has a profile defined by this simplified curve, which is much more economical and convenient than the proper curve of (XXI) in fabrication especially because acute enlargement is avoided at the top of vessel.

Figure 7:
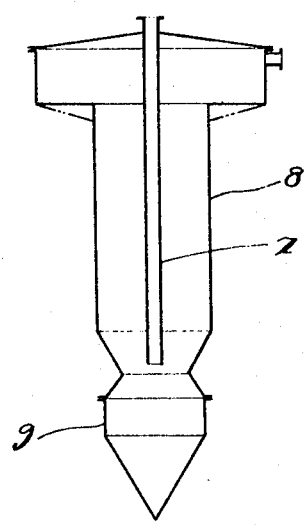
FIG. 7 is another embodiment of crystallizer in accordance with the invention.

The profile of composed straight sections illustrated in dotted line in FIG. 2 will further practically be simplified into a profile composed of a pair of cylinders; deep one and shallow one, the latter having the diameter sharply increased from the former, as shown in FIG. 7. A series of experiments carried out by the inventor confirms that the simplified profile shown in FIG. 7 is practically as satisfactory in function as the preceding profiles to crystallize even grains in continuous operation.

The crystallization apparatus in accordance with the invention is satisfactorily applicable not only for an object whose solubility is a decreasing function of temperature, such as Glauber's salt, but also for an object of general property that the solubility is an increasing function of temperature. The apparatus for crystallization of the latter object, such as shown in FIG. 3, will generally be made simpler in construction than the apparatus for crystallization of the former object, such as shown in FIG. 1.

In FIG. 3, the liquid of lowered concentration which comes up to the top of crystallizer 8 is joined with heated suppersaturated liquid 40 as it goes through a pipe 41. The joined liquid is then sent to the evaporator 6 through a pipe 42 by the action of pump 11. In the evaporator 6 the liquid is partially evaporated to increase the degree of suppersaturation in the rest of liquid, which is brought through the vertical pipe 7 down to the bottom of crystallizer 8. The liquid is then driven upward in the crystallizer 8 to grow the kernel or seed grains which it contains, as described similarly in the preceding example of apparatus shown in FIG. 1.

In FIG. 4 the apparatus is provided with a cooler 16 in place of the evaporator 6 shown in FIG. 3. It is quite similar to the apparatus of FIG. 3 both in operation and in function.

Figure 6:
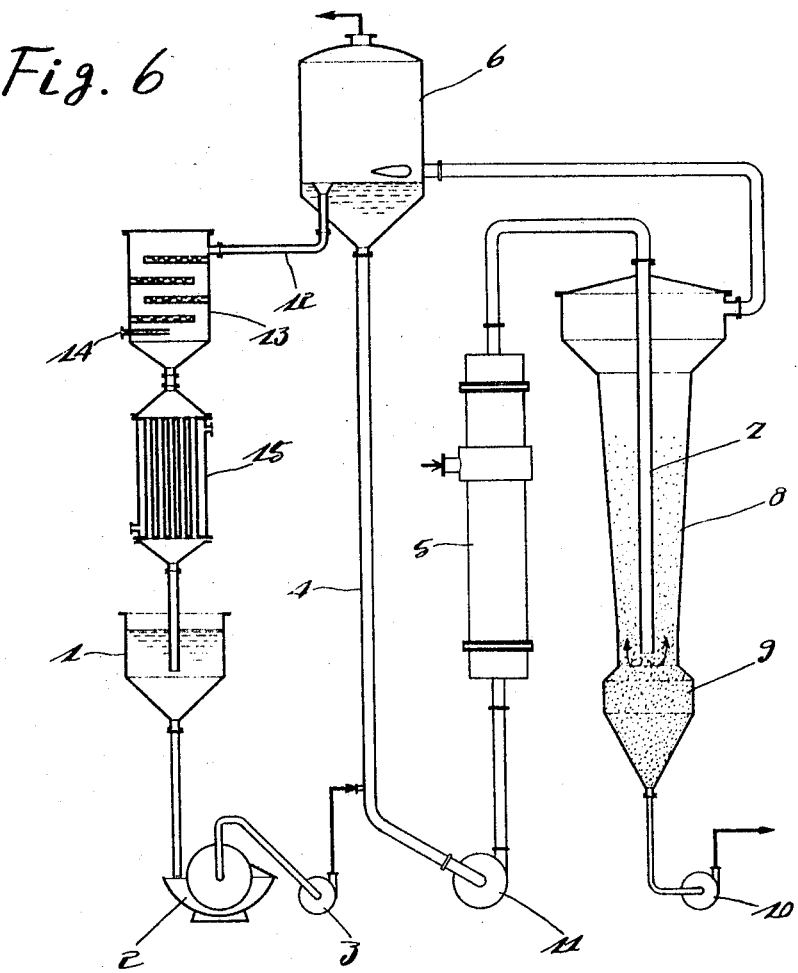
FIG. 6 is a modification of FIG. 1.

In FIG. 6 the apparatus is arranged with the crystallizer 8, evaporator 6 and heater 5 in the order reverse to the apparatus of FIG. 1. It is quite similar to the apparatus of FIG. 1 both in operation and in function, especially as suppersaturated liquid is supplied into the crystallizer 8, The crystallization apparatus in accordance with the invention and the conventional apparatus are compared in performance as tabled below. The conventional apparatus is of the "Oslo" type having a liquid circulating crystallizer in the form of a cylindrical vessel.

| Crystallizer | Invented | Oslo type |
|---|---|---|
| Liquid | Anhydrous Grauber's salt. | Anhydrous Grauber's salt. |
| Inner capacity | 26.5 m.³ | 33 m.³ |
| Operational temp | Approx. 73° C | Approx. 75° C. |
| Grain yield | 3,380 kg./hr | 2,060 kg./hr. |
| Grain size | Under 30 meshes, 2%. 30 to 60 meshes, 92%. Over 60 meshes, 6%. | Under 30 meshes, 1%. 30 to 60 meshes, 38%. Over 60 meshes, 61%. |
| Liquid circulation | 740 m.³/hr | 500 m.³/hr. |
| Suppersaturation | Inlet, 5.40 g./l. Outlet, 0.82 g./l. | Inlet, 6.25 g./l. Outlet, 2.13 g./l. |
| Density consumption per circulation. | 4.58 g./l | 4.12 g./l. |

It is taken note in the above table that the apparatus in accordance with the invention has the grain yield increased approx. 64%, while the inner capacity decreased approx. 20%, in comparison with the convenitonal Othello type; the apparatus of invention has therefore the productivity or grain yield per m.³ increased approx. 80% in comparison with the conventional Othello type. Moreover, the apparatus of invention yields grains of much higher evenness of size in comparison with the conventional apparatus. A practical sacrifice of evenness will permit the apparatus in accordance with the invention to yield over 200% per m.³ of the conventional apparatus.

In the crystallizer 8 the kernel or seed grains grow bigger and heavier as they are carried upward by the liquid flow till they cannot be carried more upward due to their own increased weight. Then the grains gradually sink downward while they further grow bigger and heavier. And only the grains which are grown sufficiently heavy sink down into a pit 9 through the neck 81 of crystallizer 8 against the upward velocity of liquid which is maximized at the neck 81 where the cross section of crystallizer is minimized. Thus grains of sufficiently even size are gathered in the pit 9, out of which they are taken through a passage 91. The size of grains is therefore determined by the upward velocity of liquid flow at the neck 81. Since the cross section of nick 81 is fixed in the fabrication of crystallizer, it will be suggested to vary the circulation volume of liquid to control the size of grains. However, the variation of circulation volume is not preferable for this purpose because it tends to put the liquid concentration out of balance at various portions of the circulation system, and therefore tends to disturb the size of grains to be yield; much apart from the purpose to control the grain size without sacrificing the evenness of grain size.

Figure 5:
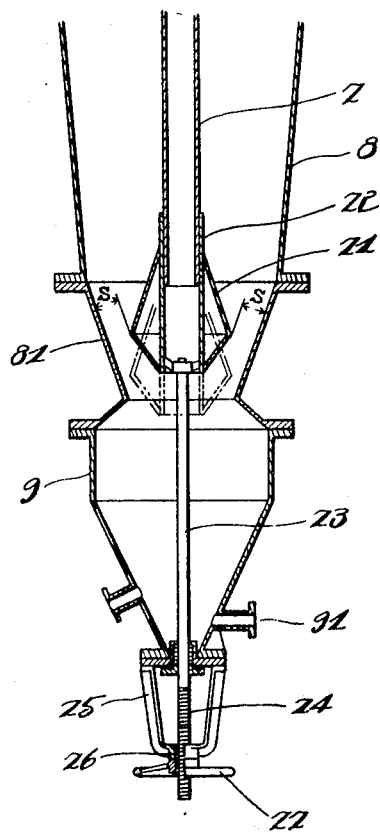
FIG. 5 is an enlarged vertical section of the grain control means provided at the neck of crystallizer in accordance with the invention.

The crystallizer in accordance with the invention is provided with a means to control the grain size freely without sacrificing the evenness of grain size. In FIG. 5, the vertical pipe 7 is provided with a sleeve 72 in an inserted relation at the lower end. The sleeve 72 is provided with a top-like conical member 71 around it. The sleeve 72 is fixed at the upper end of a rod 73, the lower end of which is threaded with a screw 74. The rod 73 goes through the pit 9 and have the screw 74 engage a nut 76 provided at the bottom of a bracket 75 located below the pit 9. The nut 76 is rotated with a handle 77 from outside to shift the top-like conical member 71 vertically so as to adjust the annular clearance S between the taper neck 81 and the conical member 71 in the bottom of crystallizer 8.

In the crystallizer 8 provided with the above-described grain-control means in accordance with the invention, the liquid which comes down the vertical pipe 7 from the evaporator 6 turns upward at the lower opening of sleeve 71 goes up through the annular clearance S between the top-like member 71 and the taper neck 81. The clearance S is made narrower as the top-like member is shifted downward with the rotation of handle 77, as shown in dotted line in FIG. 5; then the velocity of liquid flow is increased through the clearance S, and, accordingly, grains of larger size are gathered in the pit 9. The clearance S is made wider as the top-like member is shifted upward; then the velocity of liquid flow is decreased through the clearance S, and, accordingly, grains of smaller size are gathered in the pit 9. Thus the grain size is freely controlled without any disturbance of liquid concentration balance or of grain size evenness.

What I claim:

1. A continuous crystallization apparatus including a crystallizer vessel which has a side wall which in vertical cross section is generally defined by a curve representing a relationship $y = -1/x^{12}$ where $y$ is the height through which a growing crystalline grain falls and X is a radial distance of said side wall from an axis of the wall at any particular distance of $y$ so that the grain grows in proportion to the falling distance in the crystallizer vessel, thereby continuously yielding crystalline grains of substantially even size.

2. A continuous crystallization apparatus according to claim 1, wherein said curve is approximated with a plurality of straight linear sections comprising vertical sections of a pair of frustums, one of which is relatively deep and narrow while the other of which is relatively shallow and wide, the latter being capped on the former.

3. A continuous crystallization apparatus according to claim 1, further characterized that said crystallizer vessel has a neck at a lower portion thereof, supply means having a supply outlet to feed liquid into the vessel, and a vertically extending block to restrict a cross section of said neck above said supply outlet, sloped to provide a gradually changing flow area vertically, said block being vertically shiftable along said axis of the wall to vary an annular clearance at said cross section, thereby controlling the size of crystalline grains to be yielded continuously in the crystallizer vessel.

References Cited

UNITED STATES PATENTS

| 1,091,721 | 3/1914 | Weil | 23—273 |
| 1,679,055 | 7/1928 | Seidel | 23—273 |
| 1,860,741 | 5/1932 | Jeremiassen | 23—273 |
| 3,071,447 | 1/1963 | Bernhardt | 23—273 |

FOREIGN PATENTS 385,369  11/1923  Germany

NORMAN YUDKOFF, Primary Examiner

U.S. C. X.R.

159—45